United States Patent [19]
Daoud

[11] Patent Number: 6,000,250
[45] Date of Patent: Dec. 14, 1999

[54] SLIDING SECURITY OVERRIDE SYSTEM

[75] Inventor: Bassel Hage Daoud, Parsippany, N.J.

[73] Assignee: Lucent Technologies Inc., Murray Hill, N.J.

[21] Appl. No.: 09/106,929

[22] Filed: Jun. 29, 1998

[51] Int. Cl.[6] .................................................. E05B 67/38
[52] U.S. Cl. ............... 70/56; 70/2; 70/465; 70/DIG. 63; 70/159; 292/28; 292/283
[58] Field of Search ............................... 70/2, 3, 4, 5, 6, 70/7, 8, 9, 10, 11, 12, 13, 54, 55, 56, 158, 159, 160, 161, 162, 163, 164, 165, 166, 167, 168, 169, 465, DIG. 63; 292/281, 283, 285, 80

[56] References Cited

U.S. PATENT DOCUMENTS

| | | | |
|---|---|---|---|
| 1,961,041 | 5/1934 | Gilbert, Jr. | 292/148 |
| 3,889,498 | 6/1975 | Harrell | 70/78 |
| 3,926,018 | 12/1975 | Joersz | 70/19 |
| 3,938,837 | 2/1976 | Bright | 292/149 |
| 4,085,599 | 4/1978 | Fischer et al. | 70/14 |
| 5,312,266 | 5/1994 | Daoud | 439/304 |
| 5,497,416 | 3/1996 | Butler, III et al. | 379/399 |
| 5,740,685 | 4/1998 | Daoud | 70/164 |
| 5,743,116 | 4/1998 | Suster | 70/14 |

*Primary Examiner*—Darnell M. Boucher
*Assistant Examiner*—John B. Walsh

[57] ABSTRACT

A security override system for a padlockable structure comprising a hasp portion mounted to the structure and extending through an opening in an outer surface of the structure; a bracket mounted to the outer surface, the bracket having a latching end and being movable between an open position wherein the latching end is outside the opening in the structure and a closed position wherein the latching end extends through the opening; the bracket mating with the hasp portion when in a closed position for forming a padlock receiving portion; the latching end engaging a retention plate slideably moveably mounted within the structure proximate the opening, the retention plate slideably movable between an extended position wherein the retention plate engages the latching end when the bracket is in the closed position and a retracted position wherein the retention plate does not engage the latching end when the bracket is in the closed position; a security screw extending through an opening in the outer door and connected to the retention plate for moving the retention plate from the extended position to the retracted position; and wherein the bracket is movable from the closed position to the open position when the retention plate is moved to the retracted position to thereby open the padlock receiving portion.

17 Claims, 5 Drawing Sheets

SLIDING SECURITY OVERRIDE SYSTEM

FIELD OF THE INVENTION

This invention relates to a security system for use with a junction box, and in particular, to a hinged security override system for use with a junction box in a commercial setting such as, for example, a Building Entrance Protector.

BACKGROUND OF THE INVENTION

Junction boxes have long been used to collect and protect telephone and electrical wires for distribution, splicing, cross connection and other uses. In the telephony arts, such junction boxes are more commonly known as network interface units (NIUs) and/or building entrance protectors (BEPs).

In a telephone network, a network cable from the central office is connected to a BEP located at the customer site, where the individual telephone lines are broken out line by line. The network cable, which consist of a plurality of tip-ring wire pairs that each represent a telephone line, is typically connected to a connector block that is an integral part of the BEP. Such connectors may be, for example, the ubiquitous 66-type punch down connector, or an SC 99 type connector block, such as are available from Lucent Technologies Inc. The customer telephone equipment is coupled through the connector block to a central office (CO) telephone line. The CO line side of the connector is generally the bottom side of the connector block, where the CO line tip-ring wire pairs are connected using a wire-wrapping tool.

The BEP has a lockable outer door to prevent unauthorized access to the components inside. The outer door is generally secured by a keyed padlock, and the building owner retains possession of the only key. Frequently, it is necessary for others besides the building owner to open the BEP for servicing or maintenance, for example, telephone company technicians or contractors acting in their capacity. Such servicing will at times occur during non-business hours or at other times when the building owner cannot be located or is not available. If the building owner is not available the technician wishing to service the BEP would not be able to do so because the building owner has the only key to the padlock. The technician would then have to come back at a later date when the building owner was available, which is both inconvenient to the technician, and costly to the building owner and their customers. Also, if the key to the padlock was lost, it would be necessary to saw off the padlock in order to access the components within the BEP. Accordingly, a mechanism for overriding the padlock is desired, while at the same time maintaining the appearance of a secure, locked utility box.

SUMMARY OF THE INVENTION

The present invention provides a security override mechanism for accessing the components within a padlocked utility box without having to unlock the padlock, while at the same time maintaining the appearance of a secure, locked utility box.

The mechanism consists of a U-shaped bracket which is hingeably mounted to the outside of the front door of the utility box. The bracket is hingeably mounted at one end and comprises a retaining hook at the other end. The bracket is hingeably movable between an open position, wherein the hook is outside of the utility box, and a closed position, wherein the hook extends through an opening in the outer door of the utility box to a point inside the utility box. A hasp is fixedly mounted to a rear wall within the utility box and extends through the opening in the outer door of the utility box to mate with the bracket at a point outside of the outer door. The bracket is constructed such that when in its closed position, it mates with the hasp to form what appears to be, and what acts as, a conventional padlock hasp with an opening to receive a padlock. When the outer door is closed and the bracket is in its closed position mating with the hasp, a padlock is inserted through the hasp opening formed thereby in a conventional manner. The padlock is therefore between the outer door and the bracket, thus preventing the door from opening. When the bracket is in its closed position, the hook engages a retention plate slideably mounted to an inside surface of the outer door. When the retention plate is in its extended position, the interaction of the retention plate and the hook maintains the bracket in its closed position. Thus, when the hook is engaged with the retention plate, and the padlock is installed within the opening between the bracket and the hasp, the outer door cannot be opened without removing the padlock. However, the security mechanism can be overridden by the technician or building owner knowledgeable in its construction, facilitating removal of the padlock from the hasp without unlocking the padlock.

In a preferred embodiment, the retention plate is connected at one end to a security screw mounted through the outer door of the utility box. The other end of the retention plate slides through a guide channel and slideably engages the hook on the bracket. The security screw can be a specialized screw such as, for example, a KS/216 type combination screw. Also, the security screw can be constructed such that to the untrained eye it appears as merely an ordinary screw or bolt serving no apparent hidden purpose. That is, the outer door of the utility box can be constructed with a number of similar or identical looking screws to further maintain the secret function of the security screw. By turning the security screw, the retention plate is slideably moved between an extended position wherein the retention plate engages the hook, and a retracted position wherein the retention plate does not engage the hook. The bracket can then be hingeably moved to its open position, wherein the padlock can be removed without unlocking it, and the outer door can be opened. Thus, while the utility box looks as though it cannot be opened without unlocking the padlock, the technician knowledgeable in its construction can open the utility box without unlocking the padlock. Also, should the key to the padlock become lost, the building owner can open the utility box without having to cut off the padlock.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

DESCRIPTION OF THE DRAWING FIGURES

In the drawing figures, which are not to scale, and which are merely illustrative, and wherein like reference numerals depict like elements throughout the several views:

FIG. 1 is a front elevational view of the sliding security override system constructed in accordance with a preferred embodiment of the present invention mounted to a utility box and with the system in its closed and locked position;

FIG. 2. is a bottom view of the sliding security override system depicted in FIG. 1;

FIG. 2A. is a detailed bottom cutaway view of the sliding security override system depicted in FIG. 2;

FIG. 3. is an enlarged side cutaway view of the sliding security override system constructed in accordance with a preferred embodiment of the present invention mounted to a utility box and wherein the retention plate in its extended position and with the system in its closed and locked position;

FIG. 4. is a side cutaway view of the sliding security override system constructed in accordance with a preferred embodiment of the present invention mounted to a utility box and with the retention plate in its retracted position; and FIG. 5. is a side cutaway view of the sliding security override system constructed in accordance with a preferred embodiment of the present invention mounted to a utility box and with the system in its open and unlocked position.

DETAILED DESCRIPTION OF THE PREFERRED EMBODIMENTS

Figure 3:
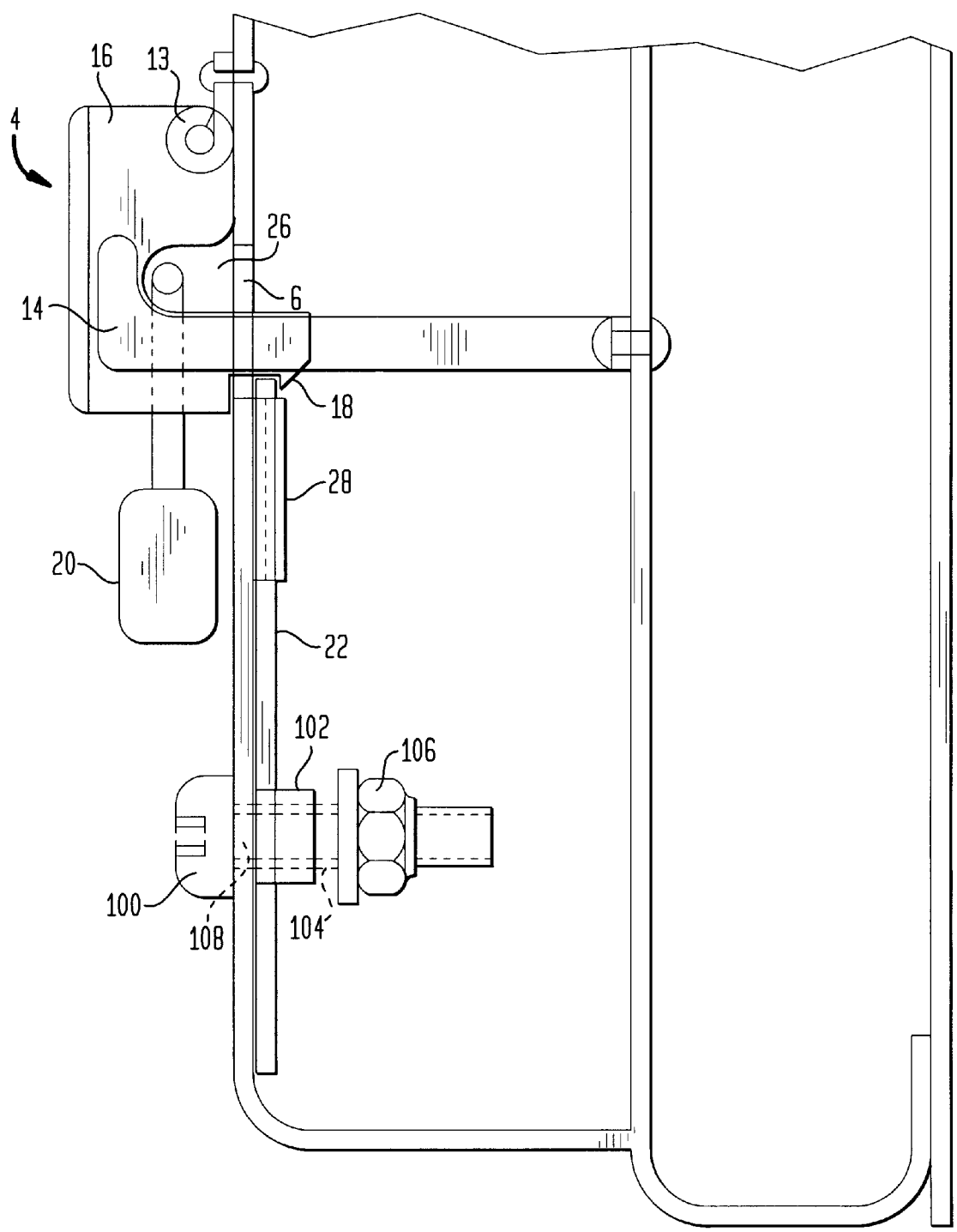
Figure 4:
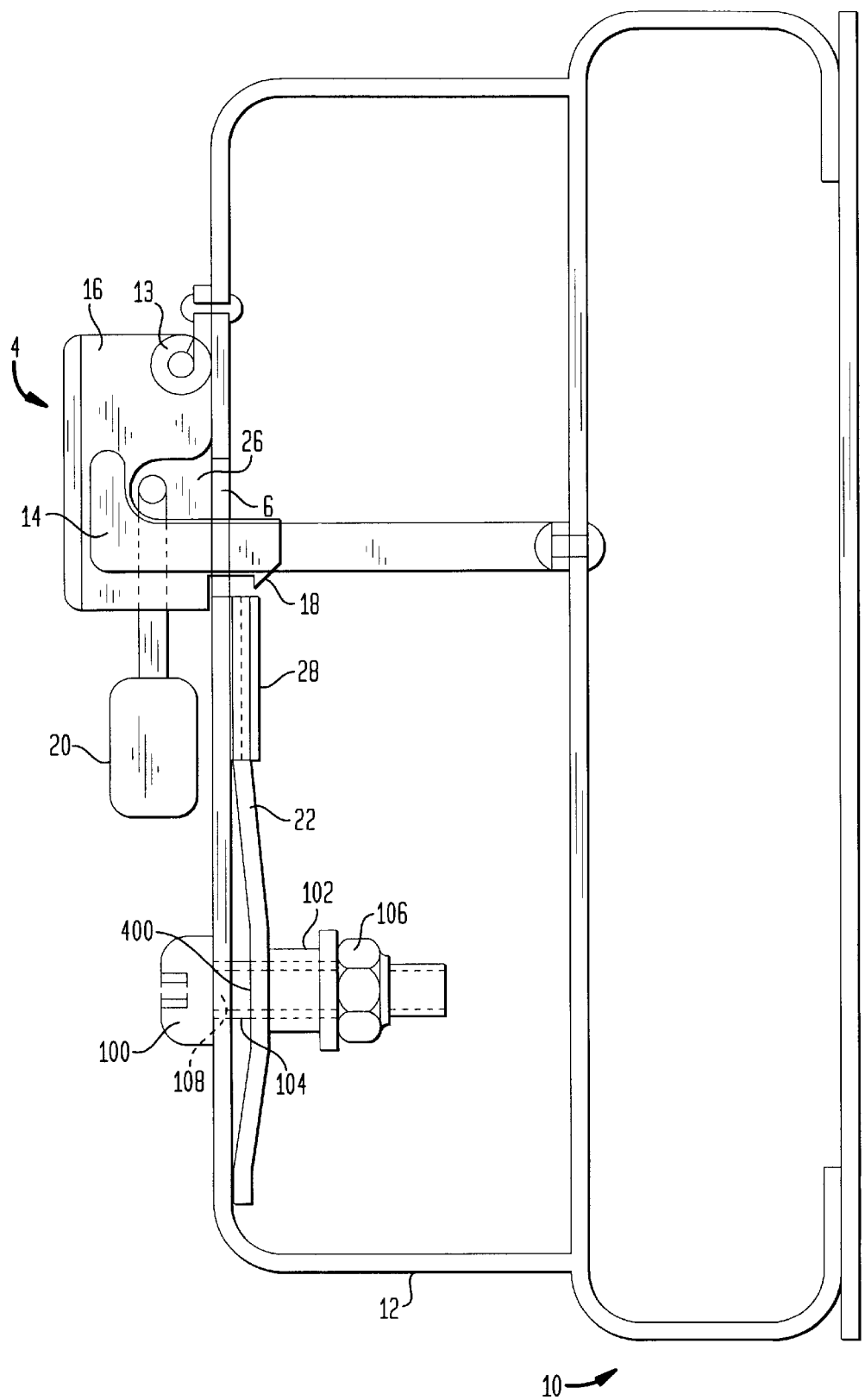
Figure 5:
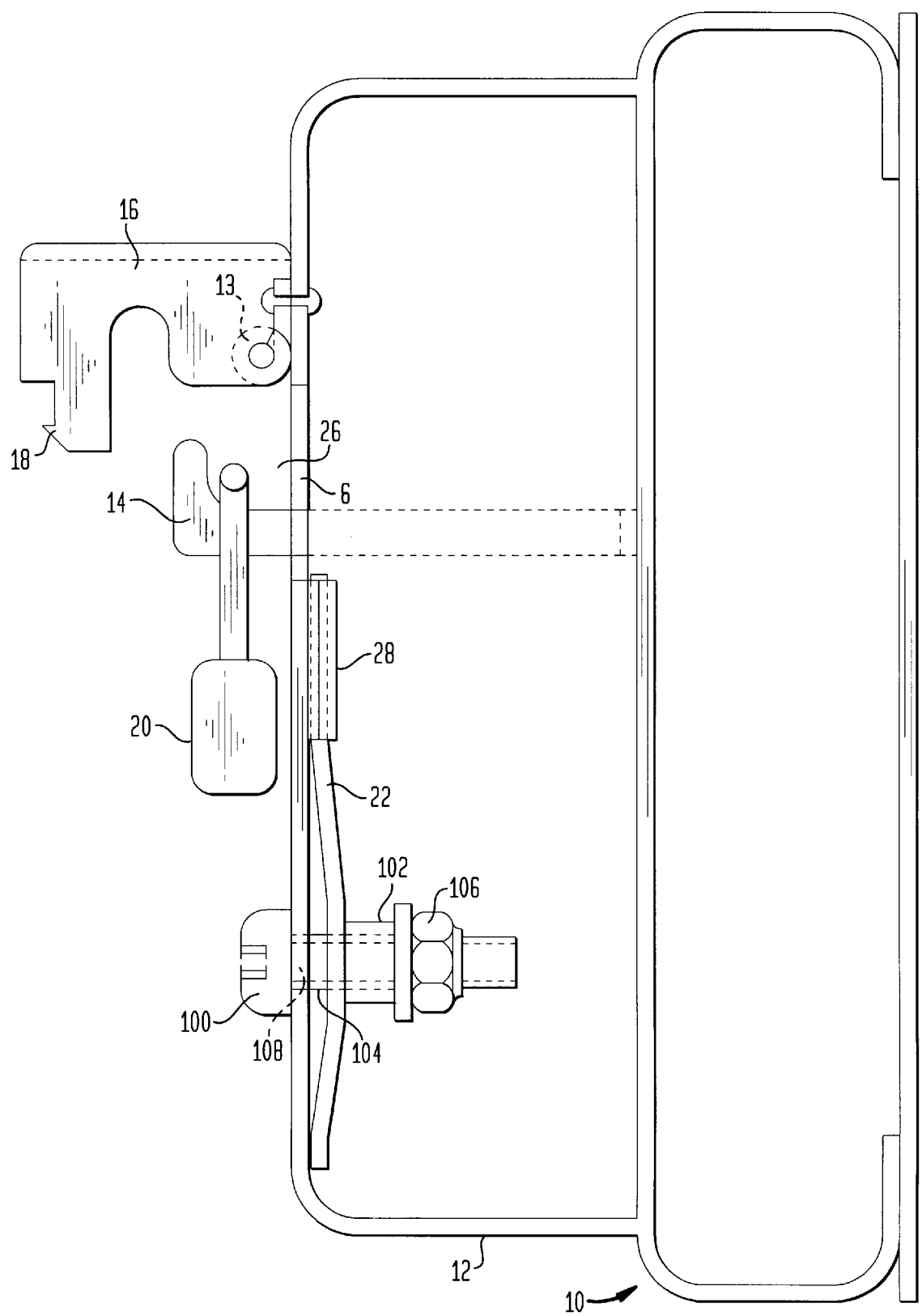

FIGS. 1 through 5 depict a sliding security override system constructed according to a preferred embodiment of the present invention. The security override system generally includes a fixed one sided hasp portion 14 mounted within a utility box 10 and extending through an opening 6 in outer door 12 of utility box 10. Fixed hasp portion 14 is constructed to mate with a generally U-shaped bracket 16 which is hingeably connected to outer door 12 of utility box 10. Bracket 16 is hingeably movable between an open position and a closed position with respect to the fixed hasp portion 14. When bracket 16 is in its closed position it mates with fixed hasp portion 14 and forms a padlock hasp with an opening 26 therein for insertion of a padlock (FIG. 3). When bracket 16 is in its open position there is a space between bracket 16 and fixed hasp portion 14 such that a locked padlock 20 can be removed from the hasp (FIG. 5). The hasp portion, bracket, and utility box, can be constructed of any number of materials, such as, by way of a non-limiting example, metal or plastic, or any other material having the necessary rigidity and strength characteristics to perform the functions described herein.

Figure 1:
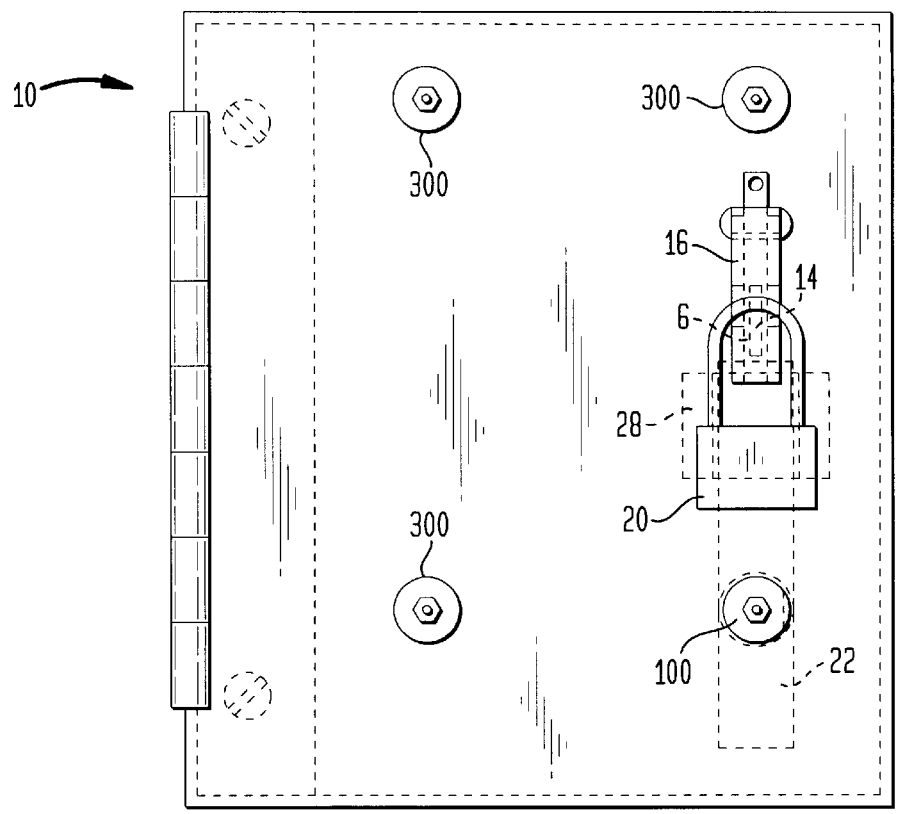
Figure 2:
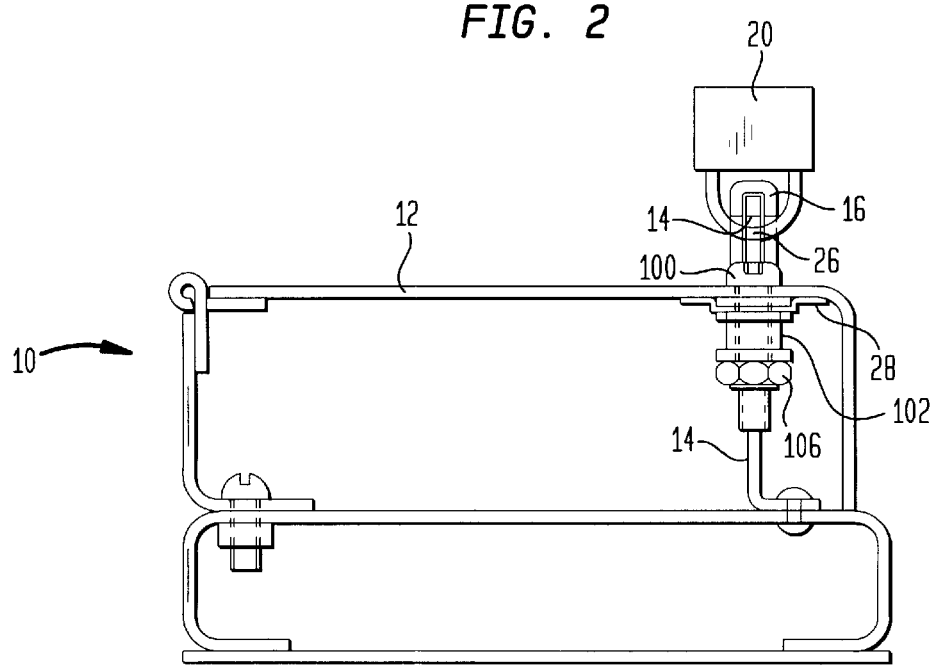
Figure 2A:
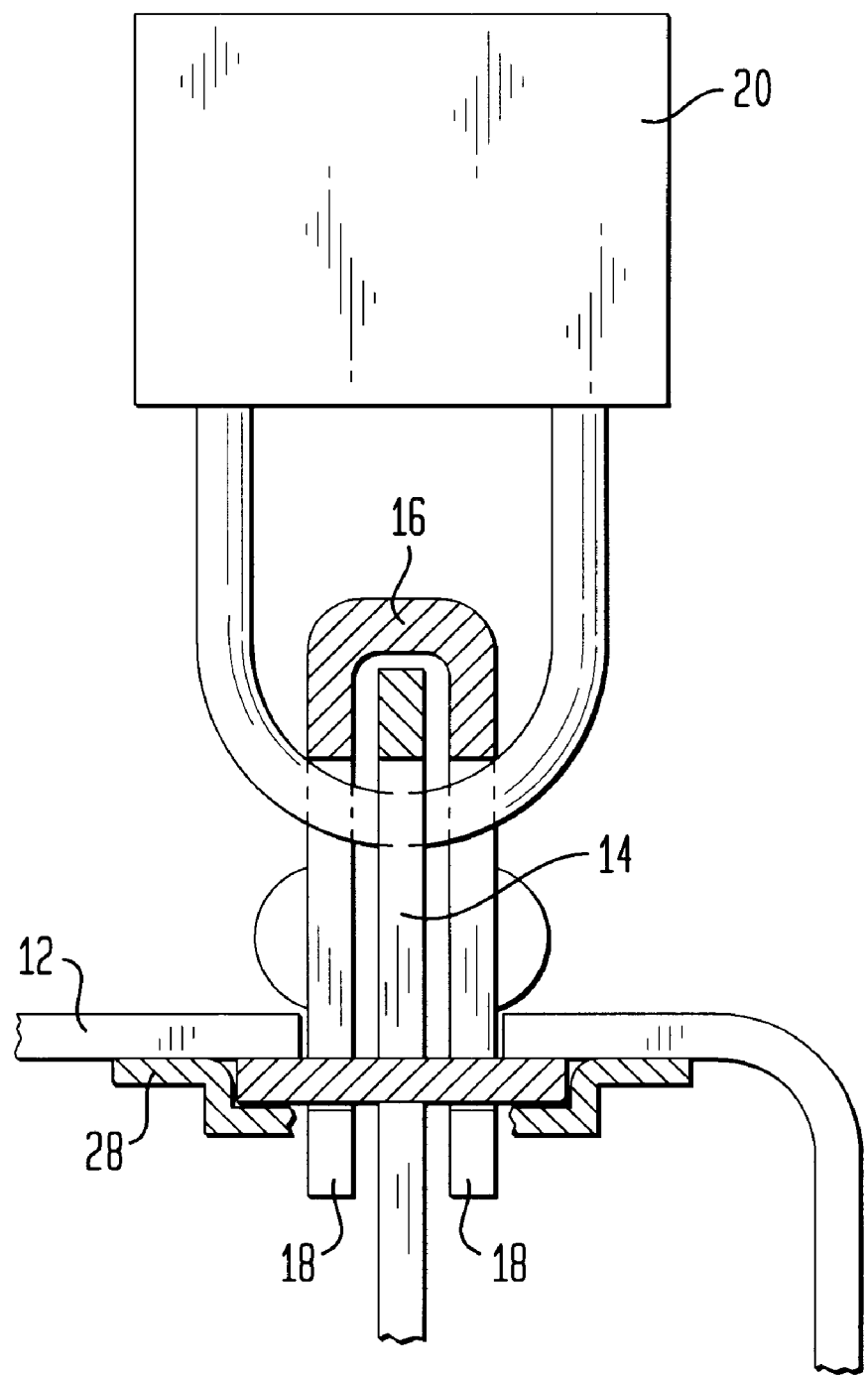

As seen in FIGS. 2A through 5, bracket 16 is generally U-shaped when viewed from the side (FIGS. 3–5) and from the front (FIG. 2A). Bracket 16 is hingeably mounted to outer door 12 at one end of the "U" by hinge 13, and comprises a latching end preferably configured as a retaining hook 18 at the other end. Bracket 16 is hingeably movable between an open position (FIG. 5), wherein hook 18 is outside of utility box 10, and a closed position (FIG. 3), wherein hook 18 extends through opening 6 in outer door 12 of utility box 10 to a point inside of utility box 10.

A fixed hasp portion 14 is fixedly mounted to a rear wall or other surface within the utility box 10 and extends through opening 6 in outer door 12 of utility box 10 to mate with bracket 16 at a point outside of outer door 12 when bracket 16 is in its closed position. As best seen in FIG. 2A, bracket 16 is constructed such that when in its closed position, hasp portion 14 fits under and within bracket 16 to form a complete hasp, generally indicated at 4, having an opening 26 to receive a padlock 20. When outer door 12 is closed and bracket 16 is in its closed position mating with hasp portion 14, padlock 20 is inserted through padlock opening 26 formed thereby. Padlock 20 is therefore between outer door 12 and the mating bracket 16 and hasp portion 14, locking door 12 closed as if by a conventional padlock hasp.

As seen in FIGS. 2A and 3, when bracket 16 is in its closed position, hook 18 engages a retention plate 22 slideably mounted to an inside surface of outer door 12 within a guide channel 28. When retention plate 22 is in its extended position (FIG. 3), hook 18 engages retention plate 22 and retains bracket 16 in its closed position. Thus, when hook 18 is engaged with retention plate 22, and padlock 20 is installed within padlock opening 26, outer door 12 cannot be opened without first unlocking and removing padlock 20. However, this locked security mechanism can be overridden by the technician or building owner by moving retention plate 22 such that is does not engage hook 18 and then moving bracket 16 to its open position and removing padlock 20.

In a preferred embodiment, as shown in FIG. 3, retention plate 22 is connected at one end to a security screw 100 mounted through an opening 108 in outer door 12 of utility box 10. The other end of retention plate 22 slides through a guide channel 28 on the inner surface of outer door 12 wherein it engages hook 18 on bracket 16. Security screw 100 can be a specialized screw such as by way of a non-limiting example, a KS/216 type combination screw, or other type screw known in the art an requiring a special tool to operate it. Or, screw 100 may be implemented to appear as one of several screws 300 deployed on door 12 so as to disguise it from appearing to have any special purpose.

Retention plate 22 is movable between an extended position (FIG. 3) and a retracted position (FIG. 4). It will be appreciated to one of skill in the art that hook 18 and retention plate 22 could be constructed in a variety of shapes and sizes to facilitate releasable mating inter-engagement therebetween, and for securely retaining hook 18 in the closed position.

As seen in FIGS. 4 and 5, in order to override the security system, retention plate 22 is moved from its extended position to its retracted position by turning security screw 100. That is, security screw 100, which is accessible from outside the utility box 10, is constructed such that retention plate 22 is connected to a connecting nut 102 which is movable via turning security screw 100. By turning security screw 100 in a given direction, connecting nut 102 drives retention plate 22 away from outer door 12 along shaft 104 of security screw 100, and retention plate 22 slides through guide channel 28 such that retention plate 22 no longer engages hook 18. A locking nut 106 is provided at the far end of security screw 100 to prevent connecting nut 102 from falling off screw 100. Bracket 16 can then be moved to its open position, wherein padlock 20 can be removed without unlocking it, and outer door 12 can be opened. One skilled in the art will recognize that security screw 100, which acts as the means for moving the retention plate 22, could be constructed in a variety of shapes and sizes an mechanisms to facilitate controlled movement of retention plate 22 from outside door 12, without departing from the spirit of the invention, such as, for example, through the use of other types of bolts known in the art, gears, locks, keyed cylinders, barrel locks, or the like. Or, retention plate 22 may be directly accessible through third opening 108, otherwise covered by a screw (not shown), such that plate 22 may be driven into its retracted position (as shown in FIG. 4) from outside door 12 by simply pushing plate 22 proximate region 400 via a tool, probe, finger or the like after removing the screw covering opening 108.

When the technician has completed servicing of the utility box, outer door 12 can be closed and re-locked without having to first unlock the padlock. That is, once the technician has completed his work, the technician closes outer door 12, replaces the locked padlock 20 over fixed hasp portion 14 and then moves bracket 16 back to its closed position. The technician then turns security screw 100 in the opposite direction wherein connecting nut 102 pulls retention plate 22 along shaft 104 towards outer door 12. As retention plate 22 is pulled towards outer door 12, the other end of retention plate 22 slides through guide channel 28 wherein it engages hook 18 and bracket 16 is locked in its closed position.

Thus, while the utility box looks as though it cannot be opened without unlocking the padlock, a technician or other user knowledgeable in its construction can open the utility box without first unlocking the padlock. Also, the technician can close the utility box when he is completed without having to first unlock the padlock. Should the key to the padlock become lost, the building owner or other authorized user can open the utility box without having to cut off the padlock. Moreover, while the invention set forth herein is generally described in connection with a junction box or other like enclosure, the person of skill will recognize from the teachings herein that the present invention may be applied to any padlocked door, compartment, enclosure or any other structure requiring securement with a padlock and hasp, or the invention may be adapted to a hasp which may mount to a variety of structures.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A security override system for a padlockable structure comprising:
    a hasp portion adapted to be mounted to an outer surface of a padlockable structure and adapted to extend through a first opening in an outer surface of said structure;
    a bracket adapted to be mounted to said outer surface, said bracket having a latching end and being movable between an open position wherein said latching end is outside said first opening and a closed position wherein said latching end extends through said first opening;
    said bracket mating with said hasp portion when in said closed position for forming a padlock receiving portion;
    said latching end engaging a retention plate adapted to be slideably moveably mounted within said structure proximate said first opening, said retention plate slideably movable between an extended position wherein said retention plate engages said latching end when said bracket is in said closed position and a retracted position wherein said retention plate does not engage said latching end when said bracket is in said closed position;
    a moving means adapted to extend through a second opening in said outer surface and connected to said retention plate for moving said retention plate from said extended position to said retracted position; and
    wherein said bracket is movable from said closed position to said open position when said retention plate is moved to said retracted position to thereby open said padlock receiving portion.

2. The security override system according to claim 1, wherein said moving means is a KS/216 type combination screw.

3. The security override system according to claim 2, wherein said bracket is adapted to be hingeably mounted to said outer surface.

4. The security override system according to claim 2, wherein said bracket is generally U-shaped and said hasp portion has a generally L-shaped end which mates beneath and within said bracket such that a locked padlock cannot be removed from said padlock receiving portion when said bracket is in said closed position and said retention plate is in said extended position without first unlocking the padlock.

5. The security override system according to claim 2, wherein said first opening comprises a first opening portion and a second opening portion, said hasp portion adapted to extend through said first portion and said latching end adapted to extend through said second portion when in said closed position.

6. The security override system according to claim 2, further comprising a guide channel adapted to be mounted on said structure for guiding said retention plate between said extended position and said retracted position.

7. The security override system according to claim 1, wherein said system is adapted to be mounted to a structure that is a Building Entrance Protector.

8. The security override system of claim 1, wherein a portion of said retention plate otherwise visible through said first opening is hidden from view by said bracket when said bracket is in said closed position.

9. A utility box comprising:
    a hasp portion mounted within a box and extending through an opening in an outer door of said box;
    a bracket mounted to said outer door;
    said bracket having a hook at one end and movable between an open position wherein said hook is outside said box and a closed position wherein said hook extends through said opening in said outer door of said box;
    said bracket mating with said hasp portion when in said closed position and forming a padlock receiving portion;
    said hook engaging a retention plate slideably mounted within said box;
    said retention plate slideably movable between an extended position wherein said retention plate engages said hook when said bracket is in said closed position and a retracted position wherein said retention plate does not engage said hook when said bracket is in said closed position;
    a moving means extending through a second opening in said outer door and connected to said retention plate for moving said retention plate from said extended position to said retracted position; and
    wherein said bracket is movable from said closed position to said open position when said retention plate is moved to said retracted position to thereby open said padlock receiving portion.

10. The utility box according to claim 1, wherein said moving means is a KS/216 type combination screw.

11. The utility box according to claim 10, wherein said bracket is hingeably mounted to said outer door.

12. The utility box according to claim 10, wherein said bracket is generally U-shaped.

13. The utility box according to claim 10, wherein said hasp portion is an L-shaped single blade hasp.

14. The utility box according to claim 10, further comprising a guide channel mounted on said outer door for guiding said retention plate between said extended position and said retracted position.

15. The utility box according to claim 10, wherein said box is a Building Entrance Protector.

16. A method of opening a locked utility box comprising the steps of:

(a) engaging a moving means extending through an opening in an outer door of a utility box and connected to a retention plate slideably mounted within said box to move said retention plate from an extended position, wherein said retention plate engages a hook on one end of a bracket, to a retracted position wherein said retention plate does not engage said hook, said bracket mounted to said outer door of said box;

(b) moving said bracket from a closed position wherein said bracket mates with a hasp portion mounted within said box and said hook extends through a second opening in said outer door, to an open position wherein said hook is outside said box;

(c) removing a locked padlock from a padlock receiving section formed when said bracket mates with said hasp portion; and (d) opening said outer door.

17. An overrideable padlock hasp comprising:

a hasp portion adapted to extend through a first opening in an outer surface of a structure;

a bracket adapted to be mounted to said outer surface, said bracket having a latching end and adapted to be movable between an open position wherein said hook is outside said first opening and a closed position wherein said latching end extends through said first opening, said bracket mating with said hasp portion when in said closed position for forming a padlock retaining hasp; and a retention plate adapted to be slideably movable between an extended position wherein said retention plate engages said latching end for retaining said bracket in said closed position and a retracted position wherein said retention plate does not engage said hook when said bracket is in said closed position so that said bracket may be moved out of said closed position to said open position such that said padlock retaining hasp is no longer formed;

a moving means adapted to extend through a second opening in said outer surface and connected to said retention plate for moving said retention plate from said extended position to said retracted position.

* * * * *